Patented July 4, 1950

2,514,026

UNITED STATES PATENT OFFICE 2,514,026

METHOD OF PREPARING 2,5-DIACYLOXY-2,5-DIHYDROFURANS

Niels Konrad Friedrich Wilhelm Clauson-Kaas, Klampenborg, Denmark, assignor to Kemisk Vaerk Koge A/S, Copenhagen, Denmark, a firm No Drawing. Application April 23, 1948, Serial No. 22,943. In Sweden April 29, 1947

8 Claims. (Cl. 260—345)

The present invention relates to new substances which are 2,5-diacyloxy-2,5-dihydrofurans and the general formula of which is as follows:

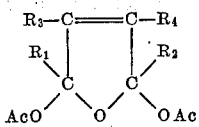

in which formula $R_1$, $R_2$, $R_3$ and $R_4$ signify hydrogen, alkyl, aryl, aralkyl or heterocyclic or alicyclic radicals, while Ac signifies acyl. The invention further relates to a method of preparing such 2,5-diacyloxy-2,5-dihydrofurans.

These compounds are useful since they can be hydrolyzed to unsaturated 1,4-dicarbonyl compounds. They may therefore serve as basic materials for various syntheses, the majority of unsaturated 1,4-dicarbonyl compounds being very reactive. The 2,5-diacyloxy-2,5-dihydrofurans are stable substances which are well adapted to serve as a starting material for the said hydrolysis. Such hydrolyses form the subject matter of the copending application No. 22,944, filed April 23, 1948.

One object of the present invention is the production of the said 2,5-diacyloxy-2,5-dihydrofurans by acting a halogen, an organic acid and an acid-binding agent on furans or furan derivatives.

Further objects or purposes of the invention will appear from the following description of the invention.

I wish it, however, to be understood that I do not desire it to be limited to the exact details described, for obvious modifications will occur to a person skilled in the art.

According to the invention 2,5-diacyloxy-2,5-dihydrofurans are prepared by the action of halogen, an organic acid and a neutralizing agent, which preferably may be a salt of an organic acid on furans or furan derivatives. The reaction proceeds through a very labile intermediate 2,5-dihalo-2,5-dihydrofuran, which under the usual reaction conditions is immediately transformed. The reaction may be explained as follows:

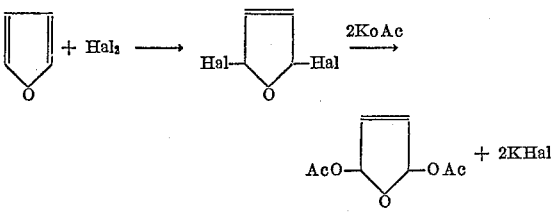

In this manner the desired compounds are obtained easily and in good yields.

Furans or furan compounds having in the α-position strongly electronegative substituents (f. inst. carboxyl groups, nitro groups or bromine) do not react in accordance with the present invention. Similarly furans having one or two carbonyl groups in the α-position (f. inst. furfurol or α-acetylfuran) react only with difficulty or not at all but such compounds or those having a carboxyl group in the α-position may in some cases be made to react according to the invention by suitably modifying said groups f. inst. by acetalizing or esterification of the carbonyl group.

The invention is illustrated by the following examples, which, however, do not limit the invention:

EXAMPLE 1

*Preparation of 2,5-diacetoxy-2,5-dihydrofuran*

20 g. of anhydrous potassium acetate and 7.25 ml. of freshly distilled furan are dissolved in 100 ml. of perfectly dry acetic acid and the mixture cooled to 10°. A solution of 5 ml. of bromine in 100 ml. of acetic acid is added under efficient stirring during 5–10 minutes. The temperature is kept at 10°. The potassium bromide formed by the reaction is filtered off by suction and the filtrate evaporated in vacuum. When the distillation of acetic acid has ceased, 100 ml. of ether is added to the residue. A small precipitate of potassium bromide and potassium acetate is filtered off and washed with ether. The total ether fraction is evaporated on the water bath at ordinary pressure and the residue distilled in vacuum. There is a small fore-run of acetic acid, then the diacetoxy compound distils at 129–132°/9 mm. as a perfectly colourless, very viscous oil. Yield: 13 g. corresponding to 70% of the theoretical amount.

EXAMPLE 2

*Preparation of 2,5-diacetoxy-2,5-dihydrofurfural diacetate*

20 g. of potassium acetate and 20 g. of furfural diacetate are dissolved in 100 ml. of glacial acetic acid. The mixture is heated to 40° C. and a solution of 5 ml. of bromine in 100 ml. of acetic acid is added. The reaction mixture is left standing over night. Then the potassium bromide, which has separated, is filtered off and the acetic acid removed by distillation in vacuum. 200 ml. of ether is added to the residue to remove a minor amount of potassium acetate. The etheral solution is shaken with a cold solution of sodium carbonate and dried with solid sodium sulphate. The ether is distilled off, and the diacetoxy compound remains as a very viscous oil, which cannot be distilled in vacuum without decomposition. Yield: 11.8 g. corresponding to 37% of the theoretical amount.

I claim:
1. Method of preparing 2,5-diacyloxy-2,5-dihydrofurans in which a furan having no strong electronegative groups in the α position is treated with halogen, an organic acid and an acid-binding agent.

2. Method of preparing 2,5-diacyloxy-2,5-dihydrofurans in which a furan having no strong electronegative groups in the α position is treated with halogen, an organic acid and a salt of an organic acid.

3. Method of preparing 2,5-diacyloxy-2,5-dihydrofurans in which a furan derivative having no strong electronegative groups in the α position is treated with halogen, an organic acid and an acid-binding agent.

4. Method of preparing 2,5-diacyloxy-2,5-dihydrofurans in which a furfurylidene ester having no strong electronegative groups in the α position is treated with halogen, an organic acid and an acid-binding agent.

5. Method of preparing 2,5-diacyloxy-2,5-dihydrofurans in which a furfuryl ester having no strong electronegative groups in the α position is treated with halogen, an organic acid and an acid-binding agent.

6. As a new product of manufacture 2,5-diacyloxy-2,5-dihydrofurans having no strong electronegative groups in the α position.

7. As a new product of manufacture 2,5-diacetoxy-2,5-dihydrofurans having no strong electronegative groups in the α position.

8. As a new product of manufacture 2,5-diacetoxy-2,5-dihydrofurfuryl diacetate.

NIELS KONRAD FRIEDRICH
WILHELM CLAUSON-KAAS.

No references cited.